United States Patent [19]

Council

[11] 3,942,598

[45] Mar. 9, 1976

[54] NON-HOSTAGE VEHICLE

[76] Inventor: Henry M. Council, 319 Ashburton Ave., SE., Atlanta, Ga. 30317

[22] Filed: Aug. 19, 1974

[21] Appl. No.: 498,479

[52] U.S. Cl. .................. 180/6.5; 89/36 H; 109/35; 180/1 R; 296/1 R; 296/102
[51] Int. Cl.² ........................................ B62D 11/04
[58] Field of Search ............. 180/6.5, 1 R; 296/102, 296/28 R, 31 R, 1 R; 280/150 C; 109/35; 256/10; 89/36 H

[56] References Cited
UNITED STATES PATENTS

| | | | |
|---|---|---|---|
| 922,956 | 5/1909 | Roberts | 109/35 |
| 2,186,597 | 1/1940 | Westbrooke | 109/35 X |
| 2,441,132 | 5/1948 | Blakey | 280/150 C |
| 2,822,214 | 2/1958 | Rivolta | 296/146 |
| 2,878,054 | 3/1959 | Linder | 296/146 X |
| 3,481,417 | 12/1969 | Jarret et al. | 180/6.5 |

FOREIGN PATENTS OR APPLICATIONS 1,432,466   2/1966   France ............................ 296/31 R Primary Examiner—Philip Goodman
Assistant Examiner—John A. Pekar
Attorney, Agent, or Firm—B. J. Powell

[57] ABSTRACT

A security vehicle adapted to prevent unauthorized entry thereinto comprising a base with an electrically conductive frame, an insulated platform on the frame and steerable propelling means for moving the base; a cage defining a security chamber over the platform carried by the base frame with an open electrically conductive framework and see-through security panels closing the openings in the framework. A selectively closable access opening is provided in the front end of the cage and a high voltage, low current charging unit imposes a high voltage, low current charge on the base frame and cage framework.

7 Claims, 8 Drawing Figures

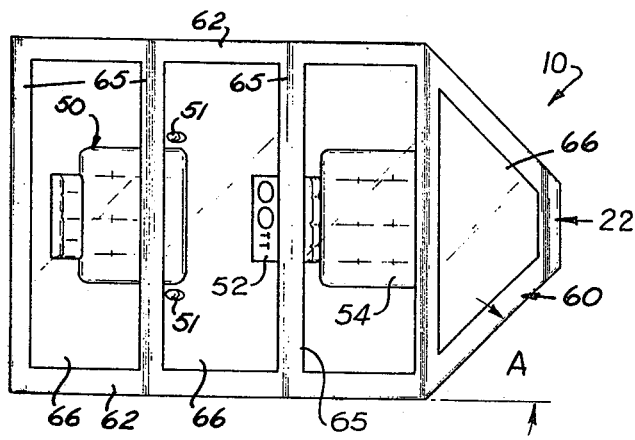
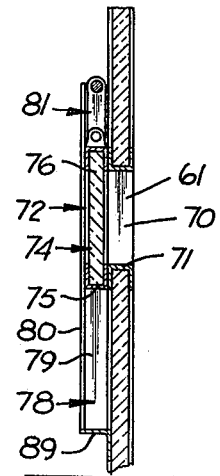
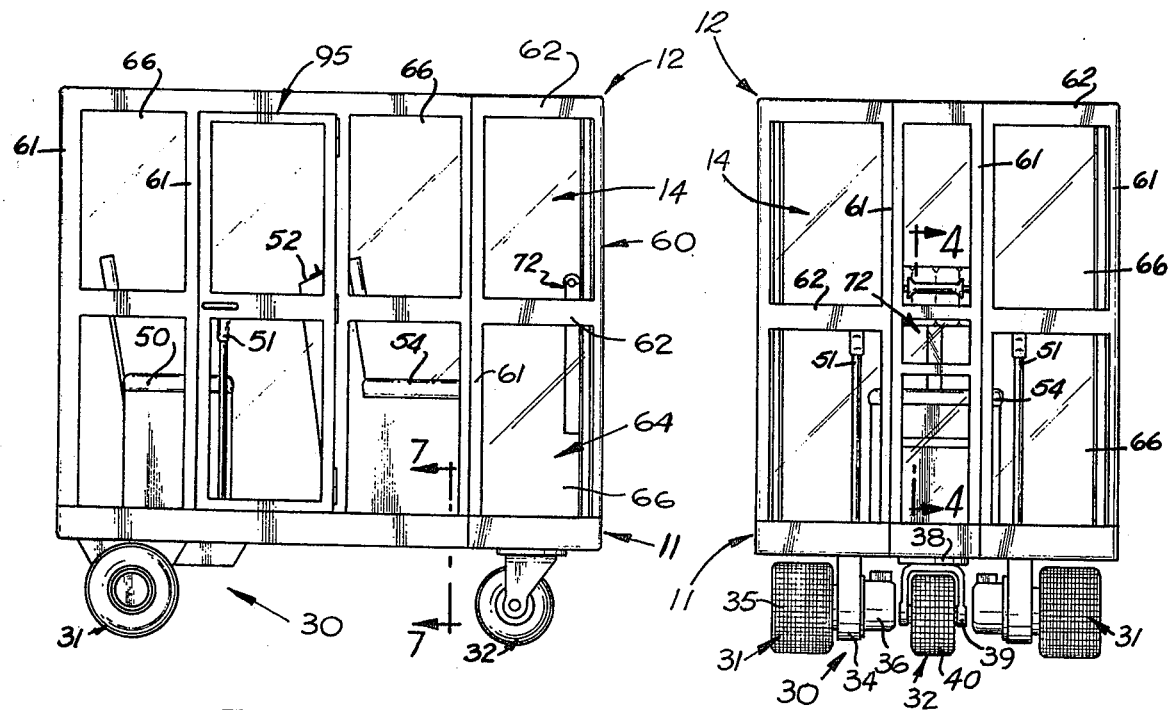

NON-HOSTAGE VEHICLE

BACKGROUND OF THE INVENTION

Due to the increased use of hostages by criminals and prison inmates to obtain certain demands, there is a need to provide some means by which security personnel can gain access to an area where there is a likelihood of being captured and held hostage. Presently, there are no means available to allow the security personnel to enter such a hazardous area that is economically feasible.

SUMMARY OF THE INVENTION

These and other problems and disadvantages associated with the prior art are overcome by the invention disclosed herein by providing a means by which security personnel may enter an area where capture would be likely without subjecting the security personnel to the danger of capture. Further, the invention disclosed herein provides a means whereby the security personnel can gain access to the hazardous area without subjecting themselves to the possibility of capture.

The apparatus of the invention includes generally a base frame which is electrically conductive and which mounts an insulated support platform thereon for carrying the security personnel. A protective cage is mounted on the base frame and defines an enclosed security chamber therein over the support platform. The protective cage includes an electrically conductive open frame work which defines openings therethrough that are closed by see-through security panels and a high voltage, low current charging apparatus is provided for imposing a high voltage, low current charge on the base frame and the cage framework to repel would-be captors. A selectively openable access door is provided at the forward end of the vehicle through which the security personnel may gain access to various means closing off the hazardous area such as doors. The vehicle is dimensioned so that it will pass through existing doorways to gain access to these areas.

These and other features and advantages of the invention disclosed herein will become more clearly understood upon consideration of the following specification and accompanying drawings wherein like characters of reference designate corresponding parts throughout the several views and in which:

BRIEF DESCRIPTION OF THE DRAWINGS

FIG. 1 is a side elevational view of a first embodiment of the security vehicle;

FIG. 2 is a front elevational view of the security vehicle of FIG. 1;

FIG. 3 is a top view of the security vehicle of FIG. 1;

FIG. 4 is a cross-sectional view taken along line 4—4 in FIG. 2;

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 5:
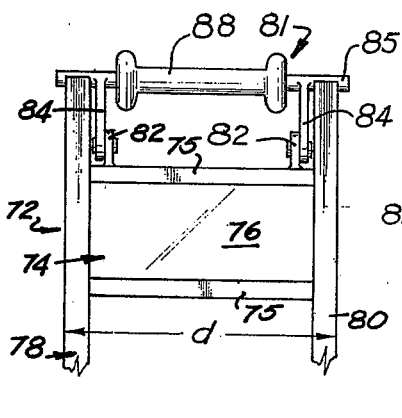
FIG. 5 is a rear elevational view of the access mechanism.
Figure 6:
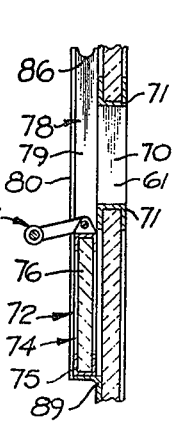
FIG. 6 is a view similar to FIG. 4 showing the access mechanism open.
Figure 7:
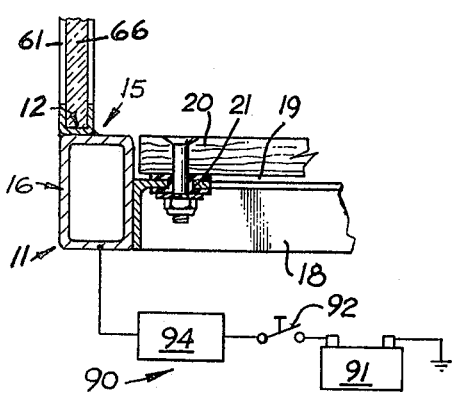
FIG. 7 is a cross-sectional view taken along line 7—7 in FIG. 1.

Referring to FIGS. 1–7, a first embodiment of the security vehicle 10 is illustrated. The vehicle 10 includes generally a support base 11 which supports and moves the vehicle across the ground or other supporting surface and a protective cage 12 which defines a security chamber 14 therein in which security personnel are carried. Referring to FIGS. 1–3 and 7, it will be seen that the support base 11 comprises generally a support frame 15 including a peripheral rail of electrically conductive material such as steel which is joined by cross braces 18 as best seen in FIG. 7. A recess 19 is provided within the bounds of the peripheral rail 16 and above the cross braces 18 which receives a support platform 20 therein. The support platform 20 is carried by the cross braces 18 through an insulated connector 21 so that the support platform 20 is electrically insulated from the base frame 15. The support platform illustrated is made out of wood so that the platform itself acts as an insulator. It will further be noted that the base frame 15 defines an inwardly tapering front section 22 which tapers inwardly at an angle A on opposite sides thereof as seen in FIG. 3 so as to allow the vehicle 10 to be moved into corners as will become more apparent.

A steerable propelling unit 30 mounts the base frame 15 thereon as best seen in FIGS. 1 and 2 for supporting and propelling the vehicle 10. The propelling unit 30 is illustrated as a tricycle type unit which has a pair of spaced apart transversely aligned rear wheel assemblies 31 and a swivel front wheel assembly 32. Each rear wheel assembly 31 includes a support bracket 34 mounted on the underside of the base frame 15 which mounts a wheel 35 thereon below the support frame 15 which is operatively connected to a drive motor 36. While various drive motors 36 may be used, those illustrated are electric motors whereby each of the motors 36 may be independently controlled to steer the vehicle as will become more apparent. The front wheel assembly 32 is centered under the front end of support frame 15 and includes a base plate 38 mounted on the underside of frame 15 with a yoke 39 journalled therein that mounts a front wheel 40 therein. Thus, it will be seen that the front wheel 40 is free to swivel so that by independently controlling the operation of each of the motors 36, the vehicle can be steered as will become more apparent.

As seen in FIGS. 1–3, an operator seat 50 is provided toward the rear end of vehicle 10 and is mounted on the top of support platform 20. A pair of control levers 51 are provided on opposite sides of seat 50 which allows the operator to independently control each of the drive motors 36 to steer the vehicle. An appropriate control console 52 is provided forwardly of the operator seat and can be used to house the power supply for the motors 36. An assistant seat 54 is mounted on platform 20 forwardly of the control panel 52 in which an assistant may ride to operate auxiliary equipment to gain access to a particular area as will become more apparent.

The protective cage 12 as best seen in FIGS. 1–3 includes an open framework 60 made of a conductive material such as steel which is mounted on the top of the peripheral rail 16 as best seen in FIG. 7 and includes vertical standards 61 and horizontal standards 62 that define openings 64 therebetween. The top of cage 12 is further provided with an open framework with cross braces 65 as seen in FIG. 3 connecting the upper horizontal members 62. The openings 64 between members 61, 62 and 65 are closed by see-through security panels 66, here shown as bullet proof glass. The front end of the tapered section 22 is provided with a selectively closable access opening 70 as best seen in FIGS. 2, 4 and 6 bounded on its upper and lower edges by braces 71 extending between the vertical standards 61 as seen in FIG. 4. The access opening 70 is selectively closable by a door assembly 72 which includes a door 74 including an open frame 75 shaped to overlay the inside of opening 70. The frame 75 mounts a security panel 76 therein adapted to cover the inside of the opening 70 as seen in FIG. 4 and is illustrated as bullet proof glass. A pair of vertically extending side tracks 78 are provided on opposite sides of opening 70 to locate the door 74 adjacent the rear end of the opening 70. Each track 78 is a U-shaped member having a central web 79 with inwardly turned flanges 80 that slidably mount the door 74 therebetween. A handle assembly 81 is provided on top of the door 74 for use in holding the door in position behind the opening 70 and for moving the door 74 within track 78. It will be noted that the handle assembly 81 as best seen in FIG. 5 includes a pair of pivot ears 82 connected to the upper edge of the door frame 75 which are pinned to links 84. The projecting ends of links 84 are connected to a cross-bar 85 that has a length longer than the distance between the central webs 79 of the side tracks 78. The upper ends of the central web 79 of side tracks 78 as best seen in FIG. 6 are notched at 86 to retain the cross bar 85 therein when the door 74 is in its raised position covering the access opening 70 as seen in FIGS. 4 and 5. An insulated handle 88 is provided on cross bar 85 to electrically insulate the assistant from the frame 60 when he manipulates the door assembly 72. The assistant opens the access opening 70 by grasping handle 88 and lifting up until the cross bar 85 clears the notches 86 in the side tracks 78. The operator then pivots the handle 88 toward the inside of the vehicle 10 and allows the door assembly 74 to slide downwardly within the side channels 78 until the opening 70 is uncovered and the door 74 contacts the stops 89 between side tract 78. The assistant can then extend an auxiliary piece of equipment (not shown) through openings 10 to remotely open doors or perform other functions.

A charging unit 90 is provided as best seen in FIG. 7 for selectively imposing a high voltage, low current charge on the base frame 15 of base 11 and the open framework 60 of the cage 12. The charging unit 90 includes an electrical power source such as battery 91 which is electrically connected to the frame 15 and framework 60 through a power switch 92 and a high voltage, low current generator 94 such as a Teslar Coil mechanism. The frame 15 and framework 60 are not connected to ground since the wheels 35 and 40 have rubber tires thereon so that the charge thereon will be maintained. The power switch 92 is located on the control console 52 so that the operator closes switch 92 after the security personnel are in position in chamber 14 to prevent approach by unauthorized persons without shock. Because the current capability of the system is low, such shock will not be fatal.

An entry door 95 is provided in the cage framework 60 so that the security personnel can enter and leave the security chamber 14. The door 95 can be locked from the inside of chamber 14.

Figure 8:
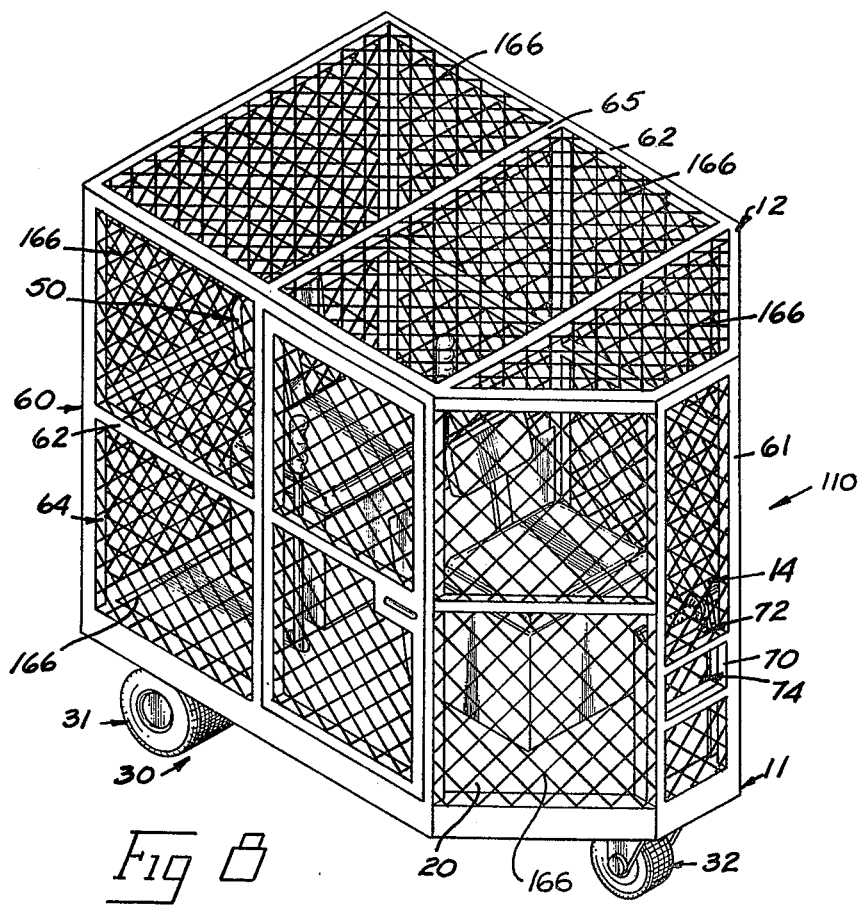
FIG. 8 is a perspective view of an alternate body of the invention.

Referring to FIG. 8, it will be seen that an alternate embodiment of the vehicle is illustrated and designated 110. Those components of vehicle 110 which are the same as vehicle 10 have like reference numbers applied thereto. The security panels 166 which cover openings 64 in framework 60 are wire gratings or expanded metal. Thus, vehicle 110 is designed for use where the weapons available to those persons attempting to gain unauthorized access to the security personnel cannot penetrate the panels 166. The operation of vehicle 110 is similar to vehicle 10.

While specific embodiments of the invention have been disclosed herein, it is to be understood that full use may be made of modifications, substitutions and equivalents without departing from the scope of the invention.

I claim:

1. A non-hostage vehicle for use by security personnel comprising:
    an electrically conductive base frame;
    ground engaging steerable propelling means carrying said base frame for supporting said base frame on the ground and propelling said base frame;
    a support platform carried within the confines of said base frame for supporting security personnel thereon, said support platform electrically insulated from said base frame;
    a protective cage mounted on said base frame and defining an enclosed security chamber therein over said support platform, said cage including a cage framework defining openings therethrough and see-through security panels closing said openings, and said cage framework is electrically conductive;
    control means within said security chamber for operating said propelling means; and
    high voltage, low current charging means electrically connected to said base frame and said cage framework for imposing a high voltage, low current thereon, said control means further including switch means for selectively enabling and disabling said charging means.

2. The non-hostage vehicle of claim 1 wherein said see-through panels are bullet-proof glass.

3. The non-hostage vehicle of claim 1 wherein said see-through panels are open grids of electrically conductive material.

4. The non-hostage vehicle of claim 1 wherein said cage and said base frame have a tapering front end thereon.

5. The non-hostage vehicle of claim 1 wherein said cage defines an access opening in the front end thereof and further including access door means for selectively closing said access opening, said door means operable from within said security chamber.

6. The non-hostage vehicle of claim 5 wherein said cage and said base frame have a tapering front end thereon; and wherein said door means includes a guide assembly, a door mounted in said guide assembly for selectively closing said access opening, and latch means for releasably maintaining said door in a position closing said access opening.

7. The non-hostage vehicle of claim 6 wherein said propelling means includes a pair of rear wheels positioned on opposite sides of said base frame, drive means for independently driving each of said rear wheels, and a swivel front wheel, said control means operatively connected to said drive means for independently driving each of said rear wheels.

* * * * *